US009139759B2

United States Patent
Hutchins et al.

(10) Patent No.: US 9,139,759 B2
(45) Date of Patent: Sep. 22, 2015

(54) METHOD OF TREATING A SUBTERRANEAN FORMATION WITH COMBINED BREAKER AND FLUID LOSS ADDITIVE

(75) Inventors: Richard D. Hutchins, Sugar Land, TX (US); Joseph A. Ayoub, Katy, TX (US); Andrey Mirakyan, Katy, TX (US); Michael D. Parris, Richmond, TX (US); Stephen D. Mason, Katy, TX (US); Ann M. W. Hoefer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 466 days.

(21) Appl. No.: 12/730,302

(22) Filed: Mar. 24, 2010

(65) Prior Publication Data
US 2010/0252264 A1    Oct. 7, 2010

Related U.S. Application Data

(60) Provisional application No. 61/166,089, filed on Apr. 2, 2009.

(51) Int. Cl.
| | |
|---|---|
| *E21B 43/267* | (2006.01) |
| *C09K 8/76* | (2006.01) |
| *C09K 8/536* | (2006.01) |
| *C09K 8/516* | (2006.01) |
| *C09K 8/66* | (2006.01) |
| *C09K 8/68* | (2006.01) |
| *C09K 8/70* | (2006.01) |
| *C09K 8/88* | (2006.01) |

(52) U.S. Cl.
CPC ................. *C09K 8/536* (2013.01); *C09K 8/516* (2013.01); *C09K 8/665* (2013.01); *C09K 8/68* (2013.01); *C09K 8/706* (2013.01); *C09K 8/88* (2013.01); *C09K 2208/26* (2013.01)

(58) Field of Classification Search
CPC ......... E21B 43/267; C09K 8/76; C09K 8/706
USPC .................................. 166/283, 305.1, 308.2
See application file for complete search history.

(56) References Cited

U.S. PATENT DOCUMENTS

| | | | |
|---|---|---|---|
| 3,711,405 A | 1/1973 | Pye et al. | |
| 3,922,173 A | 11/1975 | Misak | |
| 4,107,057 A | 8/1978 | Dill et al. | |
| 4,848,467 A | 7/1989 | Cantu et al. | |

(Continued)

OTHER PUBLICATIONS

SPE77744—Encapsulated Breaker Release Rate at Hydrostatic Pressure and Elevated Temperatures—Sho-Wei Lo, Matthew J. Miller, Jack Li. 2002 Society of Petroleum Engineers Inc. Presented at SPE Annual Technical Conference and Exhibition held in San Antonio, Texas, Sep. 29-Oct. 2, 2002.

(Continued)

*Primary Examiner* — Catherine Loikith
(74) *Attorney, Agent, or Firm* — Jeremy D. Tillman; Rachel E. Greene

(57) ABSTRACT

A method of treating a subterranean formation penetrated by a wellbore is accomplished by introducing a fluid into the wellbore containing a combined fluid loss additive and breaker. The combined fluid loss additive and breaker is formed from particles of an organic peroxide provided on a substrate. The particles are sized to facilitate fluid loss control. A treatment operation is carried out wherein a treatment fluid viscosified with a polymer is introduced into the formation through the wellbore.

21 Claims, 2 Drawing Sheets

(56) References Cited

U.S. PATENT DOCUMENTS

| | | | |
|---|---|---|---|
| 5,009,267 | A | 4/1991 | Williamson et al. |
| 5,046,562 | A | 9/1991 | Crema et al. |
| 5,213,160 | A | 5/1993 | Nahm et al. |
| 5,238,065 | A | 8/1993 | Mondshine et al. |
| 5,447,199 | A | 9/1995 | Dawson et al. |
| 5,604,186 | A | 2/1997 | Hunt et al. |
| 5,783,527 | A | 7/1998 | Dobson, Jr. et al. |
| 6,069,118 | A | 5/2000 | Hinkel et al. |
| 6,138,760 | A | 10/2000 | Lopez et al. |
| 6,412,561 | B1 | 7/2002 | Brown et al. |
| 6,435,277 | B1 | 8/2002 | Qu et al. |
| 6,637,517 | B2 | 10/2003 | Samuel et al. |
| 7,013,995 | B2 | 3/2006 | Crawshaw et al. |
| 7,066,260 | B2 | 6/2006 | Sullivan et al. |
| 7,116,560 | B2 | 10/2006 | Chou et al. |
| 7,195,068 | B2 | 3/2007 | Todd |
| 7,216,705 | B2 * | 5/2007 | Saini et al. .................... 166/279 |
| 7,219,731 | B2 | 5/2007 | Sullivan et al. |
| 7,265,079 | B2 | 9/2007 | Willberg et al. |
| 7,337,839 | B2 * | 3/2008 | Ayoub et al. ................ 166/250.1 |
| 7,398,829 | B2 | 7/2008 | Hutchins et al. |
| 7,678,745 | B2 | 3/2010 | Parris et al. |
| 8,066,058 | B2 | 11/2011 | Daniel et al. |
| 8,186,438 | B2 | 5/2012 | Ali et al. |
| 2002/0185278 | A1 | 12/2002 | Brown et al. |
| 2005/0257932 | A1 | 11/2005 | Davidson et al. |
| 2008/0202744 | A1 * | 8/2008 | Crews et al. .................. 166/246 |
| 2009/0082228 | A1 | 3/2009 | Parris et al. |
| 2010/0051263 | A1 | 3/2010 | Daniel et al. |

OTHER PUBLICATIONS

SPE80220—An Improved Encapsulated Breaker to Decrease Hydrostatic Release and Increase Thermal Stability—John W. Still, S. Bruce McConnell, Matthew J. Miller. 2003 Society of Petroleum Engineers, Inc. Presented at the SPE International Symposium on Oilfield Chemistry held in Houston, Texas USA, Feb. 5-7, 2003.
International Search Report and Written Opinion issued in PCT/IB2010/051338 on Jun. 15, 2010, 13 pages.

* cited by examiner

METHOD OF TREATING A SUBTERRANEAN FORMATION WITH COMBINED BREAKER AND FLUID LOSS ADDITIVE

CROSS-REFERENCE TO RELATED APPLICATIONS

This application claims the benefit of U.S. Provisional Application No. 61/166,089, filed Apr. 2, 2009, which is incorporated herein by reference in its entirety.

BACKGROUND

The statements in this section merely provide background information related to the present disclosure and may not constitute prior art.

In the treatment of oil and gas wells, such as hydraulic fracturing treatments, viscosifiers, such as polymer systems, are commonly used in carrier fluids. A fluid loss additive (FLA) is often used with such carrier fluids to inhibit excessive fluid loss from the carrier fluid. The FLA helps form a filter cake on the surface of the formation. In a fracturing operation, the fluid efficiency is directly related to the amount of fluid loss. High fluid efficiency minimizes the amount of fluid needed to generate a given length of fracture and limits the amount of filter cake that is generated. Fluid loss additives can be used to decrease fluid loss and increase the fluid efficiency. The filter cake formed by the FLA reduces permeability at the fluid-rock interface. Conventional FLA usually consists of fine particles, such as mica or silica flour with a broad distribution of particle sizes designed to effectively plug the pore throats of the rock matrix. Starches or other polymers can be added to help fill in the spaces and further reduce the flow.

The FLA is usually injected into the fracture with the initial pad volume used to initiate hydraulic fracturing. After the pad is injected, proppant slurry, which may also contain an FLA, is pumped into the fracture in various stages depending on job design. The proppant is designed to hold the fracture open and allow reservoir fluid to flow through the proppant pack. The proppant slurry generally includes a viscous carrier fluid to keep the proppant from prematurely dropping out of the slurry. After the proppant has been placed in the fracture, the pressure is released and the fracture closes on the proppant. After the treatment, it is necessary to remove or break both the viscosifier in the carrier fluid and the filter cake (that may contain viscosifier polymer) so that reservoir fluids can thereafter flow into the fracture and through the proppant pack to the wellbore and the production string.

Fracture clean-up issues are a known problem. Although other systems such as viscoelastic surfactants, gelled oil, slick water, etc. are used, the majority of fluids used to create the fracture and carry the proppants are polymer-based. In most reservoirs with lower permeability, the polymer concentrates as carrier fluid leaks off during the fracturing process. The concentrated polymer hinders fluid flow in the fracture and often results in underperforming fractures. Typical remedies include use of breakers, including encapsulated breakers that allow a significant increase of the breaker loading. The breaker is added to the fluid/slurry and is intended to reduce the viscosity of the polymer-based carrier fluid and facilitate fracture clean-up. Despite high breaker loading, in such breaker systems the retained permeability of the proppant pack is still only a fraction of the initial permeability and this has been the accepted situation in the industry. In certain cases, the encapsulated breakers may have a large particle size (e.g. 1 mm) that prevent the solid breaker material from entering small natural fractures of the formation so that the polymer that enters these small fractures remains unbroken. And soluble breaker materials are only used in limited concentrations as the base fluid rheology must be maintained for some time. If too much soluble breaker is used, the viscosity of the fluid may drop prematurely. Soluble breaker materials may also tend to leak off into the formation, where they are no longer effective.

U.S. Pat. No. 7,337,839 discusses fracture clean-up issues and the mechanisms of polymer concentration and the role played by the filter cake. Contrary to the prevailing theory and the industry-accepted practice of modeling polymer concentration as an average involving all the fluid pumped, the filter cake can be the main and only medium where significant polymer concentration takes place. Embodiments of the present invention provide further approaches and methods to improve the clean-up of hydraulic fracturing treatments.

SUMMARY

A method of treating a subterranean formation penetrated by a wellbore is accomplished by introducing into the wellbore a fluid containing a combined fluid loss additive and breaker formed from particles of an organic peroxide provided on a substrate. The organic peroxide particles are sized to facilitate fluid loss control. A treatment operation is performed wherein a treatment fluid containing a polymer is introduced into the formation through the wellbore.

In specific embodiments, the particles may have a particle size of about 150 microns or less. The treatment fluid may be a fracturing fluid and the particles may be contained within a pad stage of a fracturing fluid.

In certain embodiments, a breaker activator may be introduced into the wellbore. Where the treatment fluid is a fracturing fluid, the breaker activator may be introduced into the wellbore as at least one of 1) a preflush prior to introducing the fracturing fluid, and 2) a postflush after a proppant stage of the fracturing fluid has been introduced.

The substrate may be selected from at least one of an inert substrate, a porous substrate, a solid polymeric acid precursor, calcium carbonate, silica, alumina, an aluminosilicate, magnesia, titania, carbon-based material, a hydrocarbon-based material, a cellulose material, and an inorganic peroxide.

In certain embodiments, the combined fluid loss additive and breaker may be formed from particles of at least two different organic peroxides, one organic peroxide having a slower reaction rate with the polymer than the other under similar conditions. A water inert polymer may also be introduced into the wellbore in combination with the particles to facilitate fluid loss control. In still other embodiments, a solid polymeric acid precursor may be introduced in combination with the particles.

The treatment fluid may be a fracturing fluid and at least one of a pad and proppant stages of the fracturing fluid may further contain breaker materials that are not organic peroxide particles.

The organic peroxide may include a peroxyester. In particular embodiments, the organic peroxide is selected from at least one of t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids, and combinations of these. In more specific embodiments, the organic peroxide is t-butyl benzoyl peroxide.

The breaker activator may be at least one of an amine compound and an organic cobalt salt. In certain embodiments, the breaker activator is a soluble amine having the formula $R^3R^4N(CR^5R^6)_2-NR^7)_n-R^8$, where n is from 2 to 8 and where $R^3$, $R^4$, $R^5$, $R^6$, $R^7$ and $R^8$ are independently selected from hydrogen, alkyl, hydroxyalky, and combinations thereof.

The organic peroxide particles may be used in an amount of from about 0.01 g/L to about 5 g/L and may have an average particle size of from about 10 microns to about 100 microns. In certain embodiments, the organic peroxide particles are introduced with the fluid as an agglomeration of particles that disintegrates while in the fluid.

In one embodiment, a method of treating a subterranean formation penetrated by a wellbore is accomplished by introducing a fluid containing a combined fluid loss additive and breaker formed from particles of an organic peroxide provided on a substrate into the wellbore. The organic peroxide particles have an average particle size to facilitate the formation of a filtercake. A fracturing operation is performed wherein a fracturing fluid that is viscosified with a polymer is introduced into the formation through the wellbore at a pressure above the fracturing pressure of the formation.

In another embodiment, a method of treating a subterranean formation penetrated by a wellbore is accomplished by introducing a fluid containing a combined fluid loss additive and breaker formed from particles of an organic peroxide provided on a substrate into the wellbore. The organic peroxide particles may have an average particle size of from about 150 microns or less. A breaker activator is also introduced into the wellbore. A fracturing operation is performed wherein a fracturing fluid that is viscosified with a polymer is introduced into the formation through the wellbore at a pressure above the fracturing pressure of the formation.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
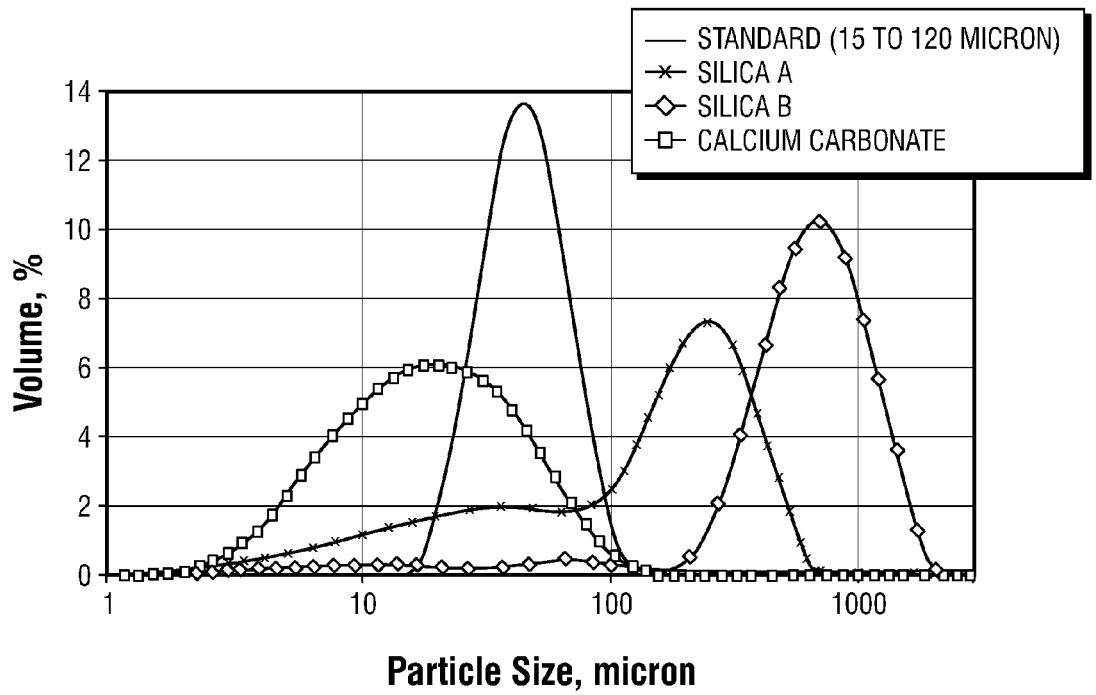
FIG. 1 is a plot of particle size distributions for organic peroxide breakers absorbed onto different substrates.

At the outset, it should be noted that in the development of any actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all points within the range are to be considered to have been specified, and that inventors possessed knowledge of the entire range and all points within the range.

Embodiments of the present invention make use of a combined breaker that also acts as a fluid loss additive to provide good fluid loss control as well as facilitates breaking of the polymer after the fracturing or treatment is finished. Although the present disclosure describes the use of the combined breaker and fluid loss additive in fracturing treatments, it can also be used in other treatments.

The design of fracturing treatments is described in U.S. Pat. No. 7,337,839, which is incorporated herein by reference in its entirety for all purposes. In the fracturing treatment, the breaker is used with aqueous viscosified fluids that are viscosified with hydratable polymers. The polymers used may be those commonly used with fracturing fluids. The polymers and amount used may provide a fluid viscosity that is sufficient to generate fracture width and facilitate transport and prevention of undue settling of the proppant within the fracture during fracture propagation. Generally, the polymer concentration is reduced to avoid proppant pack damage and maintain sufficient viscosity for opening the fracture and transporting proppant. Some embodiments of the present invention allow better cleanup of the fracture, and higher concentration of polymer may be utilized to facilitate a primary goal of higher proppant loading in the fracture. Polymer concentrations can vary with temperature, fluid system, formation depth and proppant properties and loading. Exemplary ranges of polymer concentration can include from about 1 to about 10 g/L, and more particularly from about 1.5 to about 5 g/L.

Non-limiting examples of suitable polymers include, but are not limited to, galactomannans such as guar, derivatized guars such as hydroxypropyl guar, carboxymethyl guar, carboxymethylhydroxypropyl guar, hydrophobically modified galactomannans, xanthan gum, hydroxyethylcellulose, and polymers, copolymers and terpolymers containing acrylamide monomer, and the like. The polymers may be linear or can optionally be crosslinked (non-linear) with metals ions such as borate, zirconium or titanium, including complexed metals, and so on. Other additives that may be used include surfactants, thermal stabilizers, conventional breakers and breaker aids, antifoaming agents, pH buffers, scale inhibitors, water control agents and cleanup additives, and the like.

Embodiments of the invention use a fine particle size of a solid breaker material during certain stages of a fracturing treatment employing polymers, in which the polymers and fine particles are deposited against the fracture face as a filter cake. The particles serve as fluid loss agents to enhance the filter cake's ability to restrict further fluid loss to the formation. After the treatment, there is differential viscosifier concentration in the fracture. The fracturing job can be designed to deliver a high breaker loading within the fracture where the viscosifier is disproportionately concentrated and a relatively decreased breaker loading where the viscosifier is less concentrated. In fracturing systems such as those employing polymer-based carrier fluids where the filter cake is the primary viscosifier concentration zone, the breaker can be included as fluid loss additive (FLA) that is deposited in the filter cake itself. After an appropriate delay to allow proper proppant placement within the fracture, the breaker reduces the viscosity and yield stress where the carrier fluid remaining in the proppant pack contains the most polymer, e.g. adjacent the filter cake, and can thus lead to enhanced clean-up of the proppant pack. Conventionally placed breaker or encapsulated breaker can optionally be included.

To provide the desired combined function of breaker and fluid loss additive, the particles making up the breaker/FLA will typically have a particle size of from 150 microns or less. In certain embodiments, the breaker particles will have a particle size of less than about 100 microns, more particularly from about 5 microns to about 100 microns, still more particularly from about 10 microns to about 50 microns. In certain embodiments, the particles are from about 50 microns or less. This is contrasted with conventional solid breaker materials that have a particle size on the order of about 1 mm or more.

To provide the fine particle size breaker materials, embodiments of the present invention make use of organic peroxides that are incorporated with or absorbed onto a solid substrate. The organic peroxides are particularly effective breakers that have a broad temperature range and affect a "right angle break" in contrast to a gradual decrease in viscosity commonly seen with other breakers. The organic peroxides may include those described in U.S. Patent App. Pub. No. 2009/0082228A1, which is herein incorporated by reference in its entirety for all purposes. In certain embodiments, the organic peroxide can include diacyl peroxides, dialkyl peroxides, diperoxyketals, hydroperoxides, ketone peroxides, peroxydicarbonates, peroxyesters, and the like. In certain embodiments, the organic peroxide is a peroxyester. The peroxyester may include t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids, and combinations of these.

A variety of substrates may be used for the breaker/FLA particle. The substrate may be an inert material that is not affected by the treatment or formation fluids. These may include silica materials as silica, such as silica flour, diatomite, fumed silica, etc. Alumina, aluminosilicates, magnesia and titania may also be useful as a support structure. Calcium carbonate may also be used as a substrate. The substrate may be a carbon or hydrocarbon-based material, such as carbon black, coke, activated charcoal, etc. Cellulosic materials, such as cellulose acetate and cellulose may also be used. Examples of commercially available cellulosic materials are those available as CELLUFLOW™ TA-25 and C-25 products, from Chisso Corporation of Rye, N.Y., which are microporous spherical powders. Plastics and other inert materials may also be used as the substrate.

The substrate may be configured as a highly porous substrate to provide an internal surface area or otherwise be provided with a high surface area to facilitate absorption of the organic peroxide. This may include natural and synthetic zeolite materials, porous glass spheres or particles, as well as the porous cellulosic materials, such as the previously described CELLUFLOW™ materials.

In certain embodiments, the substrate may be formed from active materials that provide additional breaking or other functional properties. One such material is the solid polymeric acid precursor materials, such as polylactic acid (PLA) and polyglycolic acid (PGA). Examples of such materials are described in U.S. Pat. No. 7,116,560, which is herein incorporated by reference in its entirety for all purposes. Such solid polymeric acid precursor materials are used in their initially solid polymeric form as the substrate. The advantage of these materials is that they can slowly degrade or dissolve to form monomeric acids, such as lactic or glycolic acid, which may provide additional breaking or other benefits to the treatment, as well as facilitate clean up because the solid polymeric acid precursor substrate is eventually dissolved.

In another embodiment, the substrate of the breaker/FLA particles is formed from an inorganic peroxide. The inorganic peroxides may include calcium peroxide, zinc peroxide and magnesium peroxide. Calcium peroxide may be effective itself as a breaker at temperatures of 175° F. to 250° F. (79.4° C. to 121.1° C.) when used in a finely ground form. As temperature increases, coarser grades may be effective. Magnesium peroxide may also be useful, but typically at higher temperatures of 250° F. (121.1° C.) and above. Zinc peroxide that may be less reactive, but may be effective over longer time periods.

The amount of the organic peroxide provided on the substrate may range from about 1% to about 99% by weight of the total weight of the breaker particle. In certain embodiments, the amount of organic peroxide provided on the substrate is from about 5 to about 60% by weight of substrate.

The substrate or breaker particle may be comprised of two-dimensional or three-dimensional shaped particles, which may be spherical or substantially spherical or non-spherical three-dimensional shapes. The substrate or breaker particle may include elongated particles such as fibers. The particles may also be in the form of platelets, disks, rods, ribbons, etc.

In certain embodiments, more than one organic peroxide may be used on the same substrate or a mixture of different particles with different organic peroxides may be used. The organic peroxides may have different reaction rates or half lives with the polymer under similar conditions. By using a combination of organic peroxides with different reaction rates or half lives, a more continual break may be provided over an extended period of time.

An example of a suitable commercially available material that may be used as the breaker/FLA material is that available as LUPEROX PXL™, commercially available from Arkema, Inc. of Philadelphia, Pa. The LUPEROX PXL™ product is provided as a t-butyl benzoyl peroxide as a 50% active peroxide on a calcium carbonate substrate (50% peroxide 50% calcium carbonate by weight) and is available as 20 micron size particles.

The amount of the breaker/FLA particles used in the fluids may vary and depend upon various factors such as filter cake thickness or amount of polymer used. In fracturing treatments, the combined breaker/FLA particles may be used in a proppant-free pre-pad fluid or pad fluid or in subsequent proppant stage fluids, or a combination of one or more of these. Higher loading of the breaker may be provided in the pre-pad or pad stages, where the filtercake is first established, with less used in the proppant stages where less filter cake may be formed. In certain embodiments, the breaker/FLA may be used in amount of from about 1 g/L to about 5 g/L in the pad or proppant-free stages. From about 0.1 to about 2.5 g/L may be used in the proppant stages.

An activator may be used with the breaker/FLA. The activator may enhance the break activity, which may initially be delayed. Examples of suitable activators are described in U.S. Pat. App. Pub. No. 2009/0082228A1 and include ethyleneamines, cobalt (II), copper chelates, e.g., copper ethylenediamine tetraacetic acid (EDTA), organic acids, e.g., para-toluenesulfonic acid, N-alkyl and N,N-dialkyl anilines, e.g. N-methyl aniline, N,N-dimethyl aniline, combinations thereof and the like.

In one embodiment, the activator comprises an amine compound. This may include ethyleneamines or alkyleneamines, such as, for example, a polyamine according to the chemical formula $R^3R^4N((CR^5R^6)_2-NR^7)_n-R^8$, where n is from 2 to 8 and where $R^3$, $R^4$, $R^5$, $R^6$, $R^7$ and $R^8$ are independently selected from hydrogen, alkyl, hydroxyalky, and combinations thereof and the like. In one embodiment, the substituted alkyl is substituted with one or more hydrophilic functional groups for improved water solubility, such as carboxylic acids; carboxy salts; carboxy esters, amides and imides; hydroxy; alkoxide; phenoxide; thiolate; thioether; xanthate; cyanide; nitrile; amino and mixtures thereof. In one embodiment, the hydrophilic functional groups, where present, are substituted on an alkyl group in one or more of the $R^3$, $R^4$, $R^7$ or $R^8$ alkyls. In one embodiment $R^3$, $R^4$, $R^5$, $R^6$, $R^7$ and $R^8$ are independently selected from hydrogen, alkyl, hydroxyalkyl, carboxyalkyl, amidoalkyl, imidoalkyl, alkoxyalkyl, phenoxyalkyl, thioalkyl, xanthoalkyl, cyanoalkyl, nitriloalkyl, aminoalkyl, combinations thereof, and the like. In one embodiment, the ethyleneamine is water soluble. In an embodiment, the ethyleneamine has up to 50, 40, 30, 24, 18, 12, 10, 8 or 6 carbon atoms. In an embodiment, each of $R^3$, $R^4$, $R^5$, $R^6$, $R^7$ and $R^8$ is hydrogen, alkyl, or hydroxyalkyl having from 1 to 12, 10, 8, 6, 5, 4, 3, or 2 carbon atoms. In an embodiment, n is from 2 or 3 up to about 8, 7, 6 or 5.

The activator may also include an organic cobalt salt.

The activators are usually dissolved within the fluid and can be added in such a concentration that the leakoff fluid will lower the active amount of activator so that substantially no breaking occurs initially, thus delaying the breaker. Later, during production, the activator in the leakoff fluid can be produced and activate the breaker that forms the filtercake. This process can be facilitated by using a preflush of activator as a prepad fluid that leaks off into the formation. In other applications the activator may be added as a postflush that is added after the treatment fluid is introduced, such as after the proppant stage of the fluid has been introduced.

In certain embodiments the activator can be used in much lower concentrations than fracturing treatments using conventional breaker materials. In such cases, the activator may be used in an amount of about 1 gal/1000 gal of fluid (0.1 vol. %) or less. In other cases, higher concentrations of activator may be used such as those that are normally used in fracturing operations (e.g. 0.5 to 5 vol. %).

The breaker may be used in combination with other materials that aid in fluid loss, such as silica flour, mica or polymers. In certain applications, the breaker/FLA particles may be used in combination with water-inert polymers. These water-inert polymer materials are described in U.S. Pat. No. 7,398,829, which is incorporated herein by reference in its entirety for all purposes. These water-inert polymer materials may include latexes and be of different particle sizes. These materials may be used as a fluid loss additive along with the breaker and facilitate formation of the filtercake. The water-inert polymer materials limit the amount of fluid loss to the formation and have been found to reduce the flow initiation pressures. The water-inert polymers may also be broken by the organic breaker and other breaker materials used and described herein. These materials are typically introduced with the pad stage of the fracturing fluid although they may be used in other stages. The water-inert polymers are typically a latex with an active polymer content of 40 to 70% by volume. The solutions are employed in a concentration from 0.1 to 10% by volume and more particularly from 0.5 to 1% by volume.

The breaker/FLA material may be used with other conventional breaker materials. These may include aqueous soluble sodium, ammonium or potassium persulfates, bromates, hypochlorites, chlorites, perchlorates and the like, as well as hydrogen peroxide and organic peroxides. These materials may be encapsulated to delay their effect and may be of much larger particle size (e.g. 1 mm). In certain applications, the small breaker/FLA particles may be used in the initial stages, such as the pad stage, with the conventional breaker materials being used in the subsequent stages, such as the proppant stages. In other embodiments they may be used together in the same stages or fluids, with lesser or more of either breaker material being included in the different stages. The conventional breakers may be used in a similar manner and in the same quantities as in conventional fracturing treatments. In other embodiments, less of the conventional breakers may be used due to the effectiveness of the breaker/FLA materials The breaker/FLA particles may also be used in combination with an acid source. These may include latent acids such as the solid polymeric acid precursor materials, which may also initially serve as a fluid loss additive. The acid may also be an injected acid that is separately injected or be formed from an acidic reaction product, such as that generated from an ester. The acid adjusts the pH of the fluids and may facilitate initiation of the breaker-polymer reaction or to facilitate breaking of the polymer and degrade the filtercake. Such acids may also be used to degrade acid solid encapsulating materials, such as the encapsulated magnesium peroxide breaker discussed herein.

By introducing fluids containing the fine particle size combined breaker/FLA particles, the particles can be deposited adjacent to the formation face during hydraulic fracturing and exist within the concentrated filter cake. This may also facilitate the use of lower concentrations of breaker. Because the solid organic peroxide breaker remains within the fracture and does not leak off, the efficiency of the breaker can approach 100%. This is contrasted with encapsulated breakers that are commonly used that may lose some of their activity by leakage and are typically less than 60% active by weight (15% leakage from a 70% active coated material).

The activators can also be added in such a concentration that the leakoff fluid will lower the active amount of activator so that substantially no breaking occurs and the breaker is delayed. Later, during production, the activator in the leakoff fluid will flow back and activate the breaker.

The fine particle size of the breaker/FLA not only provides the fluid loss additive properties, but also allows the breaker particles to be intimately mixed with the fracturing fluid so that they enter small fractures, such as natural fractures, and areas with the fluid where the larger conventional breaker materials cannot enter. The fine breaker particles remain in these confined areas so that the remaining polymer is effectively broken once the fracturing treatment is over, preventing damage and maximizing production of hydrocarbon production from natural fractures and other areas where a significant amount of hydrocarbon production can occur.

In certain cases, the combined breaker/FLA can be used in other fluids, such as slick water fluids, that may contain little or no viscosifying polymers. In such fluids, other polymers, such as the water inert polymers or latex previously discussed may be used to form a filtercake. The combined breaker/FLA may facilitate breaking or degrading of such polymers.

EXAMPLES

Example 1

Various breaker particles were evaluated and the retained conductivity was measured for a dual cross-linked carboxymethylhydroxypropyl guar (CMPHG) fluid, containing a 50% active peroxide on a substrate breaker, which constitutes an organic peroxide as t-butyl benzoyl peroxide, adsorbed onto three different sized substrates. The product substrate for the products designated A and B is silica, while for 50% active peroxide on a calcium carbonate substrate it is calcium carbonate. The particle size was measured for each of the three products. Typically three runs were made for particle size measurement using the Malvern Mastersizer 2000 Particle Size Analyzer. The averages of the three measurements, which were consistent, are shown in FIG. 1, along with a standard (15 to 120 micron) size latex particles. Note that the three products have vastly different particle sizes that lead to large changes in surface area to volume ratios in the fracturing fluid or filter cake.

Conductivity tests were conducted using each of the different breaker particles. The retained conductivity test was calculated as the measured conductivity with the fracturing fluid containing the breaker divided by the measured conductivity for the same proppant with an aqueous solution of 2 wt % potassium chloride, expressed as a percentage. The conductivity tests were run at 225° F. (107.2° C.) and 4000 psi (27.58 MPa) closure stress using CARBO HSP 20/40 mesh (0.841mm/0.420mm) proppant. The average particle sizes from the Malvern data are shown in Table 1 below, along with the retained conductivity values.

TABLE 1

| Product | Average Particle Size, Microns | Retained Conductivity, % |
| --- | --- | --- |
| 50% active peroxide on silica | 741 | 0 |
| 50% active peroxide on silica | 175 | 19 |
| 50% active peroxide on calcium carbonate | 27 | 54 |
| ammonium persulfate | ~600 (20-40 mesh) | 18 |

As can be seen, the smaller particles provide excellent retained conductivity at 54% while the larger particle sizes provided much lower retained conductivity.

Example 2

Figure 2:
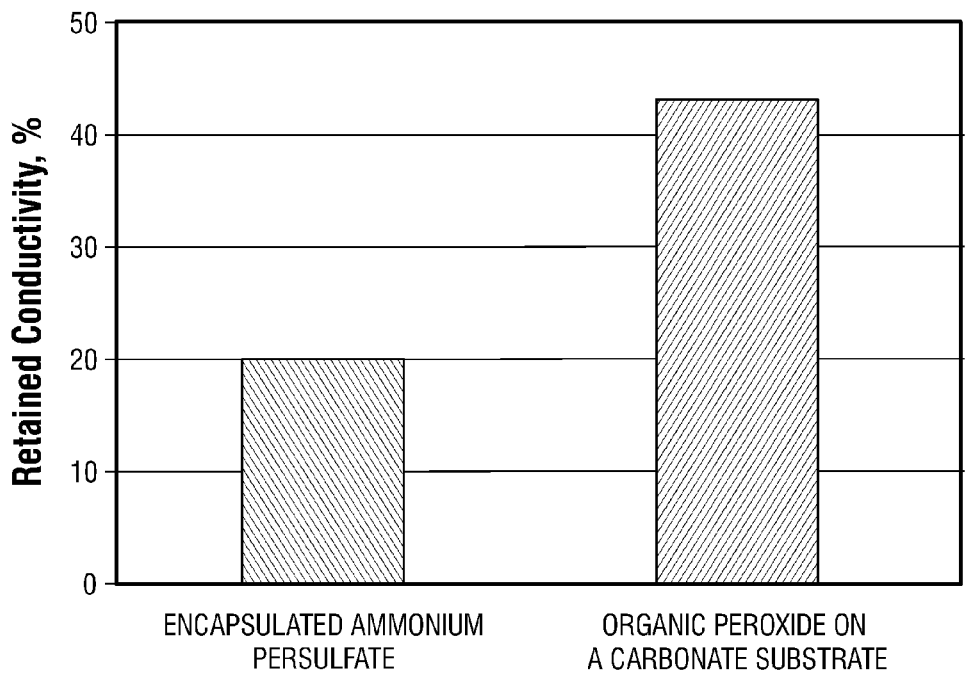
FIG. 2 is a plot of retained conductivity for polymer fluids used in conductivity tests where an encapsulated ammonium persulfate breaker and an organic peroxide on a calcium carbonate substrate were each used.

Conductivity tests were run at 200° F. (93° C.) and 3000 psi (20.7 MPa) using CARBOLITE 20/40 mesh (0.841mm/0.420mm) proppant. FIG. 2 shows a direct comparison of the retained conductivity for the encapsulated ammonium persulfate breaker and 50% active peroxide on calcium carbonate using 40 lbs/1000 gal (4.8 kg/m$^3$) of dual cross-linked carboxymethylhydroxypropyl guar (CMPHG) fracturing fluid.

Example 3

Figure 3:
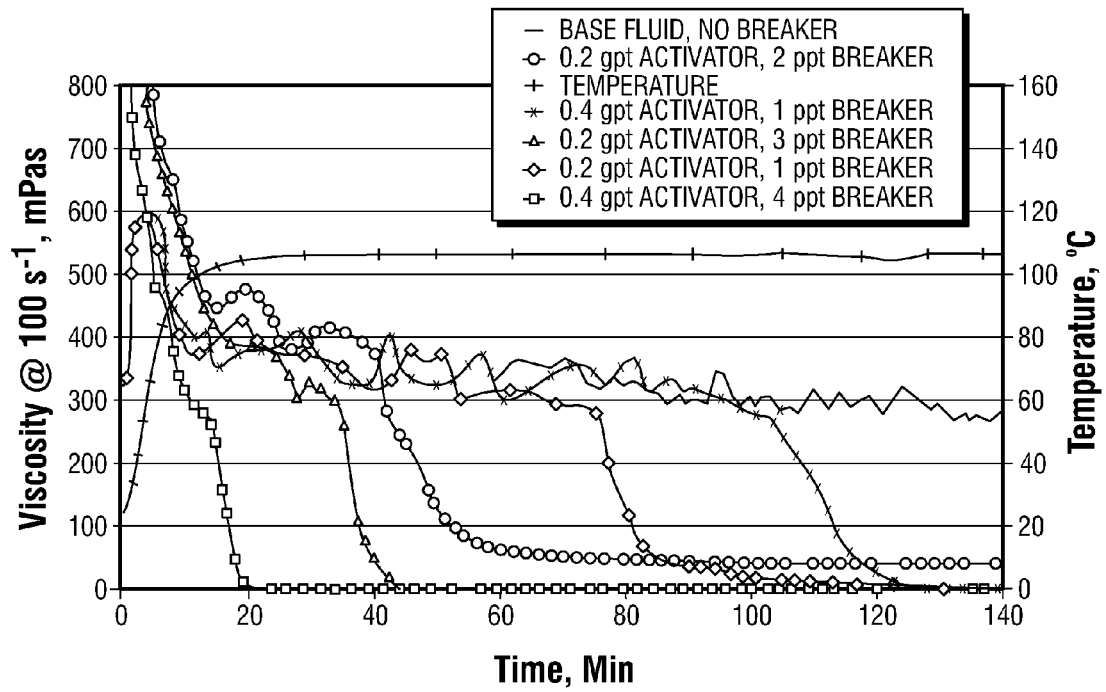
FIG. 3 is a plot of viscosity over time of a guar-based fluid incorporating varying amounts of organic peroxide breaker and activator.

It is believed that the higher conductivity is provided from the smallest particles because the breaker is concentrated in the filter cake where it is most needed. The smaller particles can offer more reactive breaker per weight of particulate and provide a more homogeneous distribution of breaker within the filter cake, allowing better contact with the polymer versus a larger particle. Further, the breaking ability of the organic peroxide is superior to that of the persulfate. The organic peroxide gives a right angle break rather than a gradual decomposition of the fluid viscosity. This behavior can be seen in FIG. 3 where a borate crosslinked guar-based fracturing fluid at 25 lbs/1000gal (2.99 kg/m$^3$) was tested using different amounts of 50% active peroxide (20 micron particles) in combination with different amounts of activator, where the activator was tetraethylenepentamine.

Example 4

Figure 4:
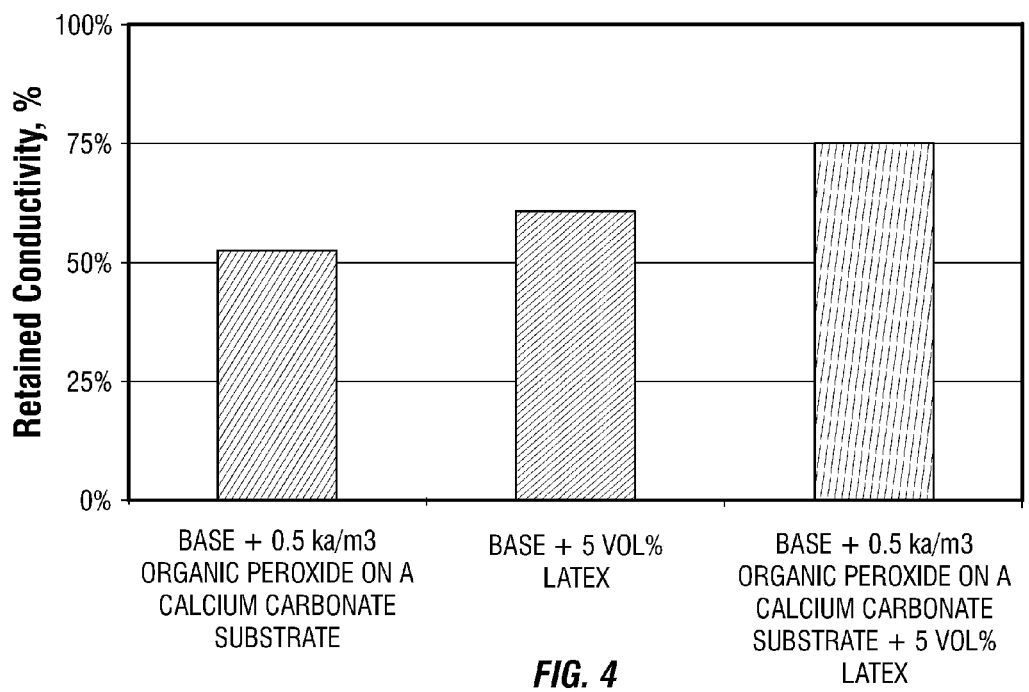
FIG. 4 is a plot of retained conductivity for polymer fluids used in conductivity tests where an organic peroxide on a calcium carbonate substrate and latex are each used alone and in combination.

Conductivity tests were run at 200° F. (93° C.) and 4500 psi (31.0 MPa) closure stress using CARBOLITE 20/40 mesh (0.841mm/0.420mm) proppant. Dynamic fluid loss experiments were conducted for two hours using a 25 lb/1000 gallon (3 kg/m$^3$) guar crosslinked with a caustic solution of sodium tetraborate. Run 1 included 0.5 kg/m$^3$ 50% active peroxide on a calcium carbonate substrate, Run 2 included 5 vol % latex and Run 3 included both 0.5 kg/m$^3$ 50% active peroxide on a calcium carbonate substrate and 5 vol % latex to create the filter cake. The retained conductivity results for the three runs are shown in FIG. 4. The combination of 50% active peroxide on a calcium carbonate substrate and latex provided the greatest cleanup result of 75%.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
   introducing into the wellbore a fluid containing a plurality of combination particles comprised of at least a fluid loss additive and a breaker, the combination particles being a plurality of solid particles derived from an organic peroxide absorbed into a substrate; and
   performing a treatment operation wherein a treatment fluid containing a polymer is introduced into the formation through the wellbore
   wherein the combination particles are sized to facilitate fluid loss control and reduce viscosity of the polymer.

2. The method of claim 1, wherein: the solid particles have a particle size of about 150 microns or less.

3. The method of claim 1, wherein: the treatment fluid is a fracturing fluid and the particles are contained within a pad stage of a fracturing fluid.

4. The method of claim 1, further comprising: introducing a breaker activator into the wellbore.

5. The method of claim 4, wherein: the treatment fluid is a fracturing fluid and the breaker activator is introduced into the wellbore as at least one of 1) a preflush prior to introducing the fracturing fluid, and 2) a postflush after a proppant stage of the fracturing fluid has been introduced.

6. The method of claim 4, wherein: the breaker activator is at least one of an amine compound and an organic cobalt salt.

7. The method of claim 6, wherein: the breaker activator is a soluble amine having the formula $R^3R^4N((CR^5R^6)_2\text{-}NR^7)_n\text{-}R^8$, where n is from 2 to 8 and where $R^3$, $R^4$, $R^5$, $R^6$, $R^7$ and $R^8$ are independently selected from hydrogen, alkyl, hydroxyalky, and combinations thereof.

8. The method of claim 1, wherein: the substrate is selected from at least one of inert substrate, a porous substrate, a solid polymeric acid precursor, calcium carbonate, silica, alumina, an aluminosilicate, magnesia, titania, carbon-based material, a hydrocarbon-based material, a cellulose material, and an inorganic peroxide.

9. The method of claim 1, wherein: the combination particles are formed from particles of at least two different organic peroxides, one organic peroxide having a slower reaction rate with the polymer than the other under similar conditions.

10. The method of claim 1, further comprising: introducing a water inert polymer in combination with the combination particles to facilitate fluid loss control.

11. The method of claim 1, further comprising introducing a solid polymeric acid precursor in combination with the combination particles.

12. The method of claim 1, wherein: the treatment fluid is a fracturing fluid and at least one of a pad and proppant stages of the fracturing fluid further contains breaker materials that is not the organic peroxide.

13. The method of claim 1, wherein: organic peroxide is a peroxyester.

14. The method of claim 1, wherein: the organic peroxide is selected from at least one of t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids, and combinations of these.

15. The method of claim 1, wherein: the organic peroxide is t-butyl benzoyl peroxide.

16. The method of claim 1, wherein: the organic peroxide is present in the solid particles in an amount of from about 0.01 g/L to about 5 g/L.

17. The method of claim 1, wherein: the combination particles have an average particle size of from about 10 microns to about 100 microns.

18. The method of claim 1, wherein: the combination particles are introduced with the fluid as an agglomeration of particles that disintegrates while in the fluid.

19. The method of claim 1, wherein an amount of the organic peroxide absorbed into the substrate is from about 5 to about 60% by the weight of the substrate.

20. A method of treating a subterranean formation penetrated by a wellbore, the method comprising:
introducing into the wellbore a fluid containing a plurality of combination particles comprised of a fluid loss additive and a breaker, the combinatio particles being a plurality of solid particles derived from an organic peroxide absorbed into a substrate; and
performing a fracturing operation wherein a fluid comprising a polymer is introduced into the formation through the wellbore at a pressure above the fracturing pressure of the formation,
wherein the combination particles are sized to facilitate fluid loss control and reduce viscosity of the polymer.

21. A method of treating a subterranean formation penetrated by a wellbore, the method comprising:
introducing into the wellbore a fluid containing a plurality of combination particles comprised of a fluid loss additive and a breaker, the combination particles being a plurality of solid particles derived from an organic peroxide absorbed into a substrate;
introducing a breaker activator into the wellbore; and
performing a fracturing operation wherein a fluid comprising a polymer is introduced into the formation through the wellbore at a pressure above the fracturing pressure of the formation,
wherein the combination partiles are sized to facilitate fluid loss control and reduce viscosity of the polymer, and
wherein the combination particles have having an average particle size of from about 150 microns or less.

* * * * *